United States Patent
Pentikäinen

(10) Patent No.: US 6,459,893 B2
(45) Date of Patent: Oct. 1, 2002

(54) METHOD AND SYSTEM FOR TRACING A SUBSCRIPTION

(75) Inventor: Heimo Pentikäinen, Oulu (FI)

(73) Assignee: Nokia Networks Oy, Espoo (FI)

( * ) Notice: Subject to any disclaimer, the term of this patent is extended or adjusted under 35 U.S.C. 154(b) by 23 days.

(21) Appl. No.: 09/796,178

(22) Filed: Feb. 28, 2001

Related U.S. Application Data

(63) Continuation of application No. PCT/FI99/00915, filed on Nov. 2, 1999.

(30) Foreign Application Priority Data

Nov. 2, 1998 (FI) .................................................. 982377

(51) Int. Cl.$^7$ .......................... H04M 3/42; H04M 1/66; H04M 1/68; H04M 3/16; H04Q 7/20
(52) U.S. Cl. ........................ 455/414; 455/410; 455/423; 379/32.05
(58) Field of Search ................................. 455/410, 411, 455/423, 551, 558, 3.05, 409, 435, 414; 379/32.05

(56) References Cited

U.S. PATENT DOCUMENTS

| | | | |
|---|---|---|---|
| 6,009,321 A | * 12/1999 | Wang et al. | ................. 455/410 |
| 6,119,000 A | * 9/2000 | Sephenson et al. | ......... 455/432 |

FOREIGN PATENT DOCUMENTS

| | | |
|---|---|---|
| DE | 198 31 345 | 1/2000 |
| EP | 0 918 444 | 5/1999 |
| WO | 98/12891 A1 * | 3/1998 ................. 455/410 |
| WO | WO 98/36602 | 8/1998 |
| WO | WO 99/65261 | 12/1999 |

OTHER PUBLICATIONS

ETS 300 324–1, "Signalling Protocols and Switching (SPS); V interfaces at the digital Local Exchange (LE) V5.1 interface for the support of Access Network (AN) Part 1: V5.1 interface specification", *European Telecommunications Standards Institute*, pp. 1–274 (Feb. 1994).

ETS 300 347–1, "Signalling Protocols and Switching (SPS); V interfaces at the digital Local Exchange (LE) V5.2 interface for the support of Access Network (AN) Part 1: V5.2 interface specification", *European Telecommunications Standards Institute*, pp. 1–271 (Sep. 1994).

* cited by examiner

*Primary Examiner*—Dwayne Bost
*Assistant Examiner*—Raymond B. Persino
(74) *Attorney, Agent, or Firm*—Altera Law Group, LLC

(57) ABSTRACT

The invention relates to a method and system for tracing a subscription in a telecommunication system. The telecommunication system comprises a local exchange, an access node connected to the local exchange, a wireless link system connected to the access node and a telecommunication terminal connected via the wireless link system to the access node. In the telecommunication system, an IMEI code corresponding to the telecommunication terminal and an IMSI code corresponding to the subscriber have been defined. In the method of the invention, the tracing of the subscription is started on the basis of the IMEI code and the tracing is converted into IMSI tracing. In the system, the access node comprises means for tracing a subscription on the basis of the IMEI code and means for converting the IMEI tracing into IMSI tracing.

16 Claims, 2 Drawing Sheets

METHOD AND SYSTEM FOR TRACING A SUBSCRIPTION

Figure 1:
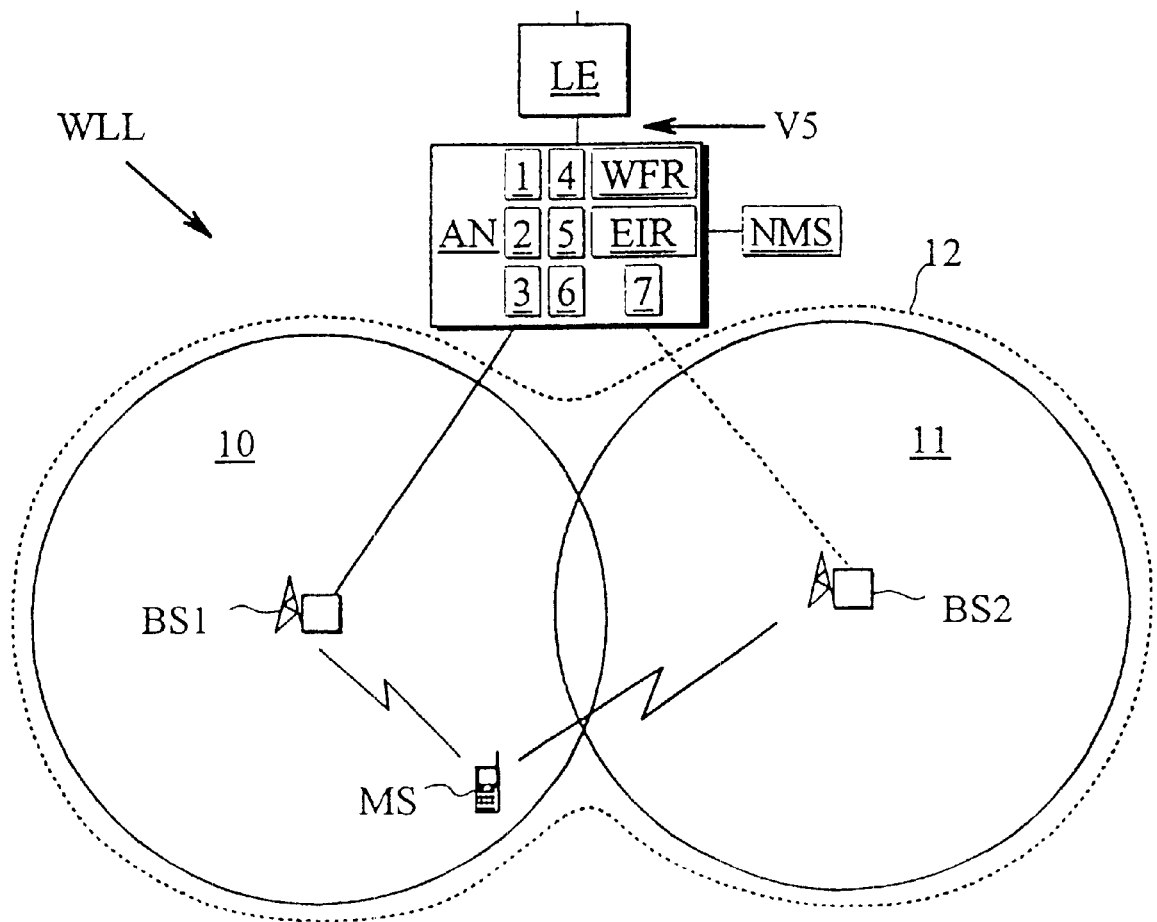

This application is a con of PCT/FI99/00915 filed Nov. 2, 1999.

FIELD OF THE INVENTION

The present invention relates to telecommunication systems, in particular WLL systems.

BACKGROUND OF THE INVENTION

WLL system (WLL, Wireless Local Loop) refers to a system in which a subscriber is connected to a telephone network via a wireless link system. The wireless link system can be implemented using mobile communication technology, such as GSM technology (GSM, Global System for Mobile communications). The subscriber interface is implemented using a special telecommunication terminal.

In a WLL system, the subscriber's telecommunication terminal is connected via a radio link to a telephone exchange or an access node. Between the telecommunication terminal and the telephone exchange or access node there is a base station, by means of which call signals received from the telecommunication terminal by radio are transmitted via the telephone exchange or access node further to the public telephone network and vice versa. The access node is connected to the telephone exchange e.g. using a V5.1 or V5.2 protocol.

Open interfaces (V5.1 and V5.2) between an access node and a telephone exchange are defined in the ETSI (European Telecommunications and Standards Institute) standards. V5 interfaces enable subscribers belonging to a physically separate access network, which may be a wired or a wireless network, to be connected using a standard telephone exchange interface.

Call tracing is a necessary function in the WLL system. Tracing is used to collect information about call-time events related to a given subscriber, such as the radio channel used, power level, location, call setup direction, duration or start time. The call tracing function can be used to locate faults in the wireless link system, to locate stolen terminals or mischief caused in the network via a terminal, or to prevent illicit use of a terminal.

Previously known tracing methods used in the GSM system are those based on IMSI and IMEI. According to its definition, IMSI (International Mobile Subscriber Identity) is a code consisting of the mobile subscriber's national identity code and a mobile communication country code, allowing unambiguous identification of the mobile subscriber. Where card-controlled telecommunication terminals are used, the international mobile subscriber identity code is card-specific, in other words, the user is identified on the basis of the SIM card (SIM, Subscriber Identity Module) placed in the telecommunication terminal and not on the basis of the terminal device itself. IMEI (International Mobile station Equipment Identity) is a code by which the telecommunication terminal can be unambiguously identified. The ETSI standard describes both IMSI and IMEI based tracing methods. Managing all the information generated as a result of different types of tracing is a complicated task which occupies resources of both the network management system and the operator. The operator must have separate means for IMSI and IMEI tracing procedures. Thus, both the means and the associated training for their use are a source of expenses to the operator.

The object of the present invention is to solve the problems described above. A specific object of the invention is to disclose a new type of method and system for tracing subscriptions in a WLL system.

BRIEF DESCRIPTION OF THE INVENTION

The invention relates to a method for tracing a subscription in a telecommunication system comprising a local exchange, an access node connected to the local exchange, a wireless link system connected to the access node and a telecommunication terminal connected to the access node via the wireless link system. Moreover, an IMEI code corresponding to the telecommunication terminal and an IMSI code corresponding to the subscriber are defined in the telecommunication system. In the method of the invention, the access node starts the tracing of a subscription on the basis of the IMEI code and converts the tracing into an IMSI tracing procedure, so that the means intended for tracing in the access node only see the IMSI tracing procedure. In an embodiment of the invention, a reference number is generated on the basis of IMEI tracing and this number is linked with the IMSI tracing. The IMEI tracing is preferably activated for a telecommunication terminal listed in the equipment register of the access node as a device to be traced.

In a preferred embodiment, a tracing report is generated which comprises the IMEI code, IMSI code and reference number. The IMSI code corresponding to the IMEI code is preferably retrieved from a subscriber data register. The IMSI code may also be taken from the call initiating messages. In an embodiment, an alarm is generated in conjunction with a call by a terminal without a subscriber identity module, in which case e.g. the IMEI code, location area and call event of the telecommunication terminal are presented in conjunction with the alarm.

In an embodiment of the method, the wireless link system is based on a digital mobile communication system, such as the GSM system.

Moreover, the invention concerns a system for the tracing of a subscription in a telecommunication system as described above. In the system of the invention, the access node comprises means for tracing a subscriber on the basis of the IMEI code and means for converting the tracing into an IMSI tracing procedure. In an embodiment, the access node comprises means for generating a reference number based on IMEI tracing and for linking the reference number with the IMSI tracing procedure. The access node preferably comprises an equipment register in which the telecommunication terminal subject to IMEI tracing is entered.

In a preferred embodiment of the system, the access node comprises means for generating a report. The report may include the IMEI code, the IMSI code and the reference number. A system according to the invention comprises a subscriber data register comprised in the access node, said register containing the IMSI code corresponding to the IMEI code. The access node preferably comprises means for obtaining the IMSI code from the call initiating messages, allowing it to be transferred to the subscriber data register.

In an embodiment, the access node comprises means for generating an alarm from a call by a telecommunication terminal without a subscriber identity module, the alarm comprising e.g. the IMEI code and location area and call event of the telecommunication terminal.

In an embodiment of the system, the wireless link system used is based on a digital mobile communication system, such as the GSM system.

The invention allows easier processing of the tracing data collected by an access node because it is now possible to utilize IMSI tracing operations and means. In the system, there is no need for separate IMEI tracing follow-up processing and associated equipment. In this way, system capacity is made available for other operations and efficiency is maximized. In addition, the consistency in IMEI and IMEI tracing procedures renders the operator's work easier.

LIST OF ILLUSTRATIONS

Figure 2:
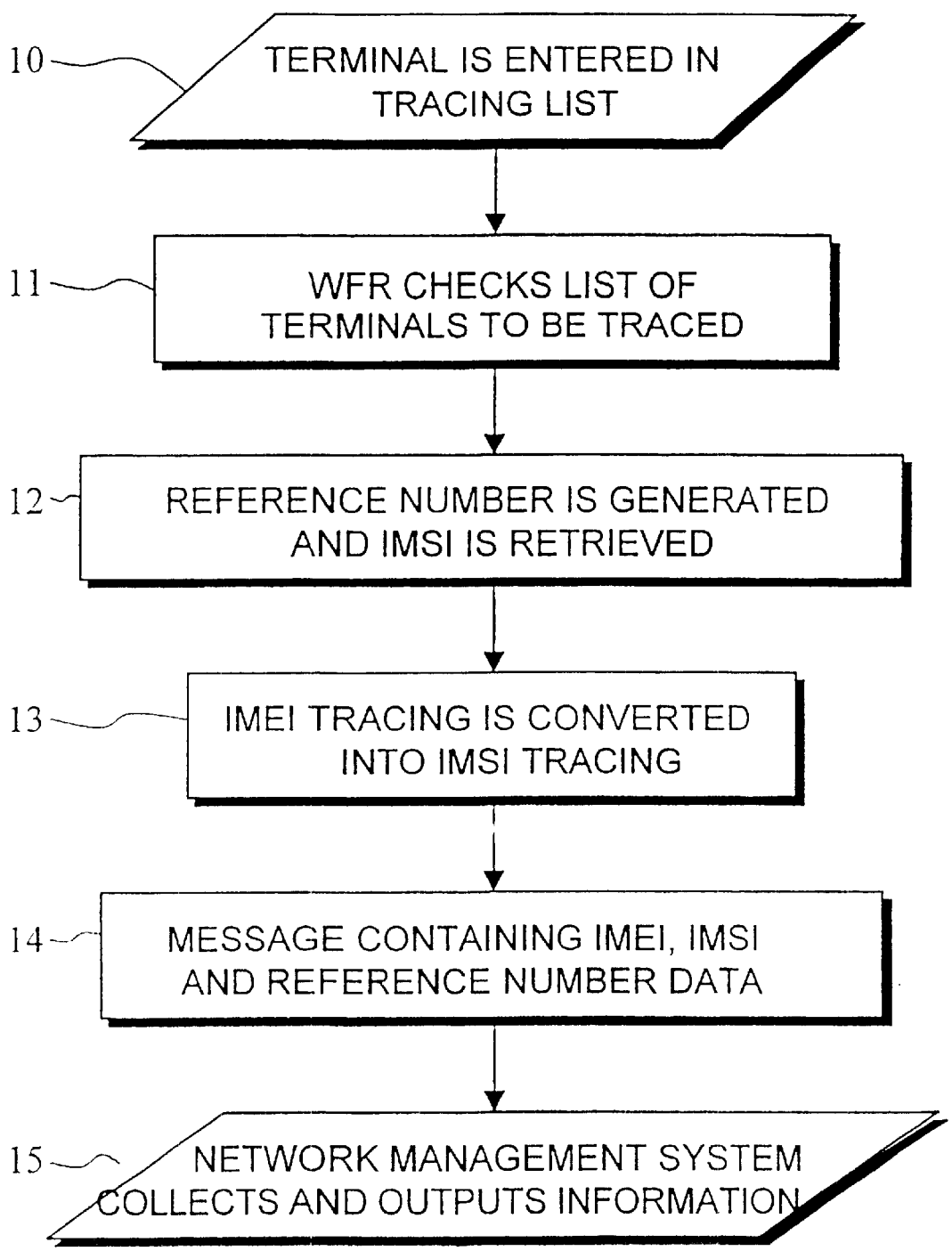

In the following, the invention will be described by the aid of a few examples of its embodiments with reference to the attached drawing, wherein FIG. 1 presents a diagram representing a system according to the invention; and FIG. 2 is a flow diagram illustrating an embodiment of the invention.

DETAILED DESCRIPTION OF THE INVENTION

FIG. 1 presents the components of a system according to the invention. In a WLL system, a telecommunication terminal MS is connected via a wireless link system WLL to an access node AN, which may be a DAXnode 5000 WLL manufactured by Nokia. The wireless link system WLL comprises at least one base station BS, which is connected via an Abis interface to the access node AN; in this example there are two base stations BS1 and BS2, forming cell areas 10 and 11. The access node AN controls the operation of the base stations BS. Together, the cell areas 10 and 11 form a mobility area 12, which is the operating area defined in this example for the terminal MS. The access node AN is connected via a V5 interface to the local exchange LE, so that, as seen by the local exchange LE, the terminal MS in the WLL system is a normal wirednetwork subscriber. Communicating with the access node AN is a network management system NMS, which comprises a MML user interface, (MML, Man-Machine Language). The access node AN comprises a subscriber data register WFR (Wireless Fixed Register), which is one of the program blocks in the access node AN.

The access node AN comprises means 1 for tracing a telecommunication terminal on the basis of the IMEI code attached to the terminal MS. These means 1 comprise e.g.: 1) devices for the activation of tracing with MML commands; 2) actual tracing apparatus (equipment identity register EIR, subscriber data register WFR, radio interface equipment); and 3) output means, such as e.g. a network management system NMS. By means of the tracing apparatus 2, comprising e.g. the subscriber data register WFR, IMEI tracing is converted into IMSI tracing, which means that tracing initiated as an IMEI tracing procedure is implemented using IMSI tracing equipment 6. Using the output means 3, a reference number is generated from the IMEI tracing and attached later to the IMSI tracing procedure after the conversion. These means 3 comprise e.g. the subscriber data register WFR and a program block in access node AN specialized in MML commands. The value of the reference number is increased by one for each tracing operation. The reference number is stored in the subscriber data register WFR in the access node AN.

The subscriber data register WFR learns the IMSI code corresponding to the IMEI code from the call initiating messages. In an embodiment, this data is stored in the subscriber data register WFR. The data is retrieved from the register WFR for the conversion of the tracing procedure. Based on the IMEI code, the subscriber data register WFR takes care that tracing started on the basis of the IMEI code is continued as IMSI tracing. Using means 4, the access node AN generates a report about the call being traced. These means 4 comprise e.g. program blocks specialized in the Abis interface in the access node AN. The report presents the IMEI code, the corresponding reference number and the IMSI code. The report is presented to the operator e.g. as a response produced by the network management system NMS.

With a telecommunication terminal MS, it is also possible to make calls without a subscriber identity module, i.e. SIM card. That is the situation e.g. in the case of emergency calls or in cases of intentional mischief committed by a user in the network. The access node AN comprises means 5 for generating an alarm corresponding to the situation. These means 5 can be implemented e.g. in the subscriber data register WFR. The information given in the alarm includes the IMEI code, location area and call event for the telecommunication terminal.

FIG. 2 presents a flow diagram of an embodiment of the method of the invention. IMEI tracing is activated via the network management system NMS or directly by using an MML terminal connected to the access node AN. The operator adds the IMEI code to a list of identity codes to be traced, which is located in the equipment identity register EIR of the access node AN, block 10. As to its type, the list may be black, gray, white or unknown. The effect of each list on a call may be either: 1) call allowed; 2) call allowed and traced; or 3) call inhibited. IMEI codes are verified by the wireless fixed register WFR; one of the verifications results in the activation of IMEI tracing, block 11. The IMEI tracing is preferably a separate tracing process, in other words, it will not be carried out in conjunction with the next call event.

The subscriber data register WFR generates a reference number from the IMEI tracing and retrieves the IMSI code corresponding to the same telecommunication terminal MS, block 12. The subscriber data register WFR sends the tracing started as IMEI tracing further as IMSI tracing, i.e. a tracing conversion is performed, block 13. In addition, the subscriber data register WFR generates a tracing report, which comprises the IMEI code and IMSI code as well as the reference numbers, block 14. The network management system NMS collects and outputs the information for the operator, block 15.

The invention is not restricted to the examples of its embodiments described above, but many variations are possible within the scope of the inventive idea defined in the claims

What is claimed is:

1. Method for tracing a subscription in a telecommunication system comprising a local exchange (LE), an access node (AN) connected to the local exchange (LE), a wireless link system (WLL) connected to the access node (AN) and a telecommunication terminal (MS) connected via the wireless link system (WLL) to the access node (AN), an IMEI code corresponding to the telecommunication terminal (MS) and an IMSI code corresponding to the subscriber, characterized in that the tracing of the subscription is started on the basis of the IMEI code and the tracing is converted into IMSI tracing.

2. Method as defined in claim 1, characterized in that, based on the IMEI tracing, a reference number is generated and the number is linked with the IMSI tracing.

3. Method as defined in claim 1, characterized in that the IMEI tracing is started for a telecommunication terminal entered in an equipment identity register (EIR) as a terminal (MS) to be traced.

4. Method as defined in claim 1, characterized in that a report comprising the IMEI code, IMSI code and reference number is generated.

5. Method as defined in claim 1, characterized in that the IMSI code corresponding to the IMEI code is retrieved from a subscriber data register (WFR).

6. Method as defined in claim 1, characterized in that the IMSI code is obtained from the call initiating messages.

7. Method as defined in claim 1, characterized in that an alarm is generated in conjunction with a call by a telecommunication terminal (MS) without a subscriber identity module, the IMEI code, location area and call event of the telecommunication terminal (MS) being presented in conjunction with the alarm.

8. Method as defined in claim 1, characterized in that the wireless link system (WLL) is based on a digital mobile communication system.

9. System for the tracing of a subscription in a telecommunication system comprising a local exchange (LE), an access node (AN) connected to the local exchange (LE), a wireless link system (WLL) connected to the access node (AN) and a telecommunication terminal (MS) connected via the wireless link system (WLL) to the access node (AN), an IMEI code corresponding to the telecommunication terminal (MS) and an IMSI code corresponding to the subscriber, characterized in that the access node (AN) comprises means (1) for tracing the subscription on the basis of the IMEI code and means (2) for converting the IMEI tracing into IMSI tracing.

10. System as defined in claim 9, characterized in that the access node (AN) comprises means (3) for generating a reference number based on the IMEI tracing and linking the reference number with the IMSI tracing.

11. System as defined in claim 9, characterized in that the access node (AN) comprises an equipment identity register (EIR), in which the telecommunication terminal (MS) under IMEI tracing is entered.

12. System as defined in claim 9, characterized in that the access node (AN) comprises means (4) for generating a report about the tracing.

13. System as defined in claim 9, characterized in that the access node (AN) comprises a subscriber data register (WER), which contains the IMSI code corresponding to the IMEI code.

14. System as defined in claim 9, characterized in that the access node (AN) comprises means (7) for obtaining the IMSI code from the call initiating messages.

15. System as defined in claim 9, characterized in that the access node (AN) comprises means (5) for generating an alarm from a call by a telecommunication terminal (MS) without a subscriber identity module.

16. System as defined in claim 9, characterized in that the wireless link system (WLL) is based on a digital mobile communication system.

* * * * *